(12) United States Patent
Reese et al.

(10) Patent No.: US 7,482,310 B1
(45) Date of Patent: *Jan. 27, 2009

(54) METHOD OF FRACTURING SUBTERRANEAN FORMATIONS UTILIZING EMULSIONS COMPRISING ACRYLAMIDE COPOLYMERS

(75) Inventors: Rhys R. Reese, Monroeville, PA (US); Paul Rey, Pittsburgh, PA (US)

(73) Assignees: Kroff Chemical Company, Inc., Pittsburgh, PA (US); Superior Well Services, Inc., Indiana, PA (US)

( * ) Notice: Subject to any disclaimer, the term of this patent is extended or adjusted under 35 U.S.C. 154(b) by 492 days.

This patent is subject to a terminal disclaimer.

(21) Appl. No.: 10/988,216

(22) Filed: Nov. 12, 2004

Related U.S. Application Data

(60) Provisional application No. 60/519,147, filed on Nov. 12, 2003.

(51) Int. Cl.
*C09K 8/588* (2006.01)
*E21B 21/00* (2006.01)
*E21B 43/26* (2006.01)
*B01F 3/08* (2006.01)
*B01F 17/00* (2006.01)

(52) U.S. Cl. .............. 507/225; 166/270; 166/270.1; 166/370; 166/308.1; 516/22; 516/27

(58) Field of Classification Search ............... 507/225; 166/270, 270.1, 271, 370, 308.1; 516/22, 516/27
See application file for complete search history.

(56) References Cited

U.S. PATENT DOCUMENTS

| | | | |
|---|---|---|---|
| 3,041,318 A | 6/1962 | Hess | |
| 3,278,506 A | 10/1966 | Charmot et al. | |
| 3,284,393 A | 11/1966 | Vanderhoff et al. | |
| 3,624,019 A | 11/1971 | Anderson et al. | |
| 3,646,997 A * | 3/1972 | Chenevert | 166/254.2 |
| 3,826,771 A | 7/1974 | Anderson et al. | |
| 3,841,402 A * | 10/1974 | Knight et al. | 166/247 |
| 3,868,999 A | 3/1975 | Christopher, Jr. et al. | |
| 4,024,097 A | 5/1977 | Slovinsky et al. | |
| 4,070,323 A | 1/1978 | Vanderhoff et al. | |
| 4,233,165 A * | 11/1980 | Salathiel et al. | 507/200 |
| 4,460,627 A * | 7/1984 | Weaver et al. | 427/212 |
| 4,524,003 A | 6/1985 | Borchardt | |
| 4,579,667 A | 4/1986 | Echt et al. | |
| 4,643,801 A | 2/1987 | Johnson | |
| 4,672,090 A | 6/1987 | Chan | |
| 4,772,659 A | 9/1988 | Chan | |
| 4,783,492 A | 11/1988 | Dovan et al. | |
| 4,935,456 A | 6/1990 | Huang et al. | |
| 4,977,962 A | 12/1990 | Himes et al. | |
| 5,102,558 A * | 4/1992 | McDougall et al. | 507/260 |
| 5,278,203 A | 1/1994 | Harms | |
| 6,200,420 B1 | 3/2001 | Begala et al. | |
| 6,342,468 B1 | 1/2002 | Geib | |
| 6,395,134 B1 | 5/2002 | Chen et al. | |
| 6,413,433 B1 | 7/2002 | Maury et al. | |
| 6,454,902 B1 | 9/2002 | Chen | |
| 6,488,091 B1 | 12/2002 | Weaver et al. | |
| 6,517,677 B1 | 2/2003 | Cardile et al. | |
| 2003/0008779 A1 | 1/2003 | Chen et al. | |

OTHER PUBLICATIONS http://www.sigmaaldrich.com/catalog/search/ProductDetail?ProdNo=S6760&Brand=SIGMA.*
John L. Gidley et al., *Recent Advances in Hydraulic Fracturing*, Monograph vol. 12, SPE, Henry L. Doherty Series, Copyright 1989, Chapter 6, pp. 109-130.

* cited by examiner

*Primary Examiner*—Timothy J. Kugel
(74) *Attorney, Agent, or Firm*—The Webb Law Firm

(57) ABSTRACT

A method of treating a subterranean formation penetrated by a well bore including:
  (a) preparing a fracturing fluid containing a mixture resulting from:
    (I) providing a water-in-oil emulsion composition that includes:
      (i) 5% to 99% by weight of a water-in-oil emulsion polymer comprising a polymer or copolymer containing repeat units from an acrylamide monomer;
      (ii) 0.5% to 90% by weight of a carrier solvent; and
      (iii) 0 to 90% by weight of a fluidizing agent; and adding
      (iv) 0.1% to 10% by weight of one or more inorganic microparticles, where the total of all components is 100% by weight; and
    (II) adding the water-in-oil emulsion composition to water; and
  (b) contacting the subterranean formation with the fracturing fluid.

25 Claims, No Drawings

METHOD OF FRACTURING SUBTERRANEAN FORMATIONS UTILIZING EMULSIONS COMPRISING ACRYLAMIDE COPOLYMERS

CROSS-REFERENCE TO RELATED APPLICATION

This application claims the benefit of priority to U.S. Provisional Application No. 60/519,147 filed Nov. 12, 2003, entitled "Method of Fracturing Formations," and is related to copending application Ser. No. 10/988,424 entitled "Water-In-Oil Polymer Emulsion Containing Microparticles" filed Nov. 12, 2004, the disclosure of both of which are herein incorporated by reference in their entirety.

TECHNICAL FIELD OF THE INVENTION

The present invention relates to methods for treating subterranean well formation and particularly to the use of improved subterranean formation hydraulic fracturing fluids.

BACKGROUND OF THE INVENTION

Bore holes in subterranean formations are often treated to increase their permeability in order to enhance recovery of hydrocarbons. Fracturing of the formations is carried out to increase the production rate of the oil and/or gas contained in the local strata. The fracturing procedure increases flow by creating new fissures and facilitating the connectivity of the existing pores and natural channels contained in a reservoir rock which would otherwise not allow adequate flow to reach the well bore in sufficient quantities for commercial value.

Hydraulic fracturing is a process by which cracks or "fractures" in the adjacent substrate or zone are created by forcing a viscous fluid at a rate and pressure that exceeds the parting pressure of the rock. The continued injection of the viscous fracturing fluid expands the fractures and a particulate material such as sand may be suspended in the fracturing fluid and introduced into the created fissures.

As the pumping pressure at the surface is released, the "frac" fluid will retreat from the formation back to the well. The particulate material, known as proppant, is left behind and acts to prevent the expanded fractures from closing, allowing conductive channels to remain. The viscosity of the fracturing fluid is important for the transport of the proppant material into fractures. Poor or low viscosity can lead to a phenomenon known as "screening out," where the proppant drops out in the well hole and the penetration of the proppant into the fractures is significantly impaired. After the fracturing process of the formation is accomplished, the fracturing fluid is generally broken, and reverts to a low viscosity fluid for removal from the formation. The viscosity is reduced by breaking down the high molecular weight molecules or by compressing the molecular conformation of the molecules contained in the fracturing fluid. A common approach has been the addition of a slow acting breaker to the fracturing fluid prior to pumping the fracturing fluid into the subterranean formation.

The majority of hydraulic fracturing treatments are water-based fluids. Polymers are typically used to enhance the viscosity of the fluid. Polymers can be classified by the following types: naturally occurring, modified naturally occurring and synthetically derived. Naturally occurring and modified naturally occurring polymers used as viscosity agents frequently include a polysaccharide such as guar, derivatized guar polymers such as hydroxypropylguar, hydroxyethyl cellulose and hydroxyethyl cellulose derivatives. These are economical water-soluble polymers and can be readily crosslinked, which further increases the viscosity of the fluid.

In order to allow gelled and crosslinked polysaccharide fracturing fluids to carry sufficient proppant material, high concentrations of crosslinking agents are often required, which increases the cost and viscosity of the fracturing fluid. Water-based fracturing fluids including gelled and crosslinked polysaccharide gelling agents have had significantly reduced fluid loss as compared to other fracturing fluids, which reduce or eliminate the need for costly fluid loss additives. However, because the gelled and crosslinked polysaccharides have a large molecular dimension due to the linking of individual polymer molecules, the filter cake produced from the viscous fracturing fluid on the walls of well bores penetrating producing formations and in fractures formed therein are often very difficult to remove.

Another problem experienced in the use of a water-based fracturing fluid including a gelled and crosslinked polysaccharide gelling agent is that it must be mixed in holding tanks for a considerable length of time for hydration of the gelling agent to occur. During the fracturing process carried out in a well, the hydrated fracturing fluid generally is pumped out of the holding tanks, mixed with proppant and other additives on the fly and pumped down the well bore to the formation being fractured. If, during the job, the down hole pressure profile and other parameters that are obtained in real time indicate that a change in the fracturing fluid properties is required, that is, a change in the fracturing fluid viscosity to prevent screening out of the proppant from the fracture or the like, it is generally impossible to do so since it takes a very long time for an adjustment to be made and for the changed fracturing fluid to reach the formation being treated. Another problem related to pumping the fracturing fluid from holding tanks and combining the proppant material, crosslinker and other additives used on the fly is that the procedure requires the use of expensive metering and other similar equipment.

In some instances, dry synthetic polymers based on acrylamide are used to enhance the viscosity of the fluid. In general, synthetic polymers are less likely to contain debris and insoluble contaminants than their natural polymer counterparts. Synthetic acrylamide-based polymers are more linear in nature and offer the potential for higher molecular weight when compared to polysaccharide-based polymers and this reduces the dosage required to produce a given solution viscosity. However, dry polymers can be difficult to "make down" into a solution. This difficulty results in the viscosity of the fluid being less predictable, in the formation of "fish eyes" (insoluble or partially soluble polymer particles and agglomerates) and in a general lack of homogeneity in the fluid.

Thus, there is a need in the art for improved subterranean formation treating fluids that have short hydration times, do not produce insoluble residues, do not leave a filter cake, have high proppant carrying capacities and can have their properties changed "on the fly."

SUMMARY OF THE INVENTION

The present invention is directed to a method of treating a subterranean formation penetrated by a well bore including:
 (a) preparing a fracturing fluid containing a mixture resulting from:
  (I) providing a water-in-oil emulsion composition that includes:

(i) 5% to 99% by weight of a water-in-oil emulsion polymer including a polymer or copolymer containing repeat units from an acrylamide monomer;
(ii) 0.5% to 90% by weight of a carrier solvent; and
(iii) 0 to 90% by weight of a fluidizing agent; and adding
(iv) 0.1% to 10% by weight of one or more inorganic microparticles, where the total of all components is 100% by weight; and
(II) adding the water-in-oil emulsion composition to water; and
(b) contacting the subterranean formation with the fracturing fluid.

DETAILED DESCRIPTION OF THE INVENTION

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

As used herein, "alkyl" refers to an acyclic or cyclic, saturated hydrocarbon group having a carbon chain length of, for example, from $C_1$ to $C_{25}$. Nonlimiting examples of suitable alkyl groups include, but are not limited to, —$(CH_2)_3CH_3$, —$(CH_2)_4 CH_3$, —$(CH_2)_5 CH_3$, —$(CH_2)_{10} CH_3$, —$(CH_2)_{23} CH_3$ and cyclohexyl. "Alkylene" refers to a divalent alkyl group.

As used herein, the term "aryl" refers to aromatic groups that include, without limitation, groups such as phenyl, biphenyl, benzyl, xylyl, napthalenyl, anthracenyl and the like, as well as heterocyclic aromatic groups that include, without limitation, pyridinyl, pyrrolyl, furanyl, thiophenyl and the like. "Arylene" refers to a divalent aryl group.

As used herein, "alkaryl" refers to an acyclic alkyl group substituted with at least one aryl group, for example, phenyl, and having an alkyl carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups and aliphatic hydrocarbon groups. "Alkarylene" refers to a divalent, alkaryl group.

As used herein, "aralkyl" refers to an aryl group substituted with at least one acyclic alkyl group, for example, phenyl, having an alkyl substituent group with a carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups and aliphatic hydrocarbon groups. The alkyl group can be substituted with halogens. "Aralkylene" refers to a divalent aralkyl group.

As used herein, "alkenyl" refers to an acyclic or cyclic hydrocarbon group having one or more double bonds and having an alkenyl carbon chain length of $C_2$ to $C_{25}$. As used herein, "alkenylene" refers to acyclic or cyclic hydrocarbon groups having one or more double bonds and having an alkenylene carbon chain length of $C_2$ to $C_{25}$.

As used herein, the term "water-in-oil emulsion polymer" refers to a system or composition having a hydrophobic liquid as a continuous phase and an aqueous solution or gel containing one or more water soluble or water dispersible polymers, as a dispersed phase. The dispersed phase, present as droplets and/or discrete microgels, can have a droplet and/or discrete microgel size ranging from at least 10 nm, in some cases at least 100 nm, in other cases at least 1 micron and in some situations at least 5 microns and may be up to 500 microns, in some cases up to 250 microns, in other cases up to 100 microns, in some situations up to 50 microns and in other situations up to 10 microns. The size of the droplet and/or discrete microgel dispersed aqueous phase can vary between any of the values recited above. The size of the droplets and/or discrete microgels can be determined by light scattering and/or scanning electron microscopy as is known in the art.

As used herein, the term "polymer" refers to a water soluble or water dispersible polymer without reference to the current or past form which may include aqueous solution, dry, bead, gel, or gel within a dispersed phase. The term "polymer" is meant to include homopolymers, copolymers, terpolymers, etc., as well as polymer complexes.

As used herein, the phrase "repeat units from an acrylamide monomer" is meant to indicate not only the monomer acrylamide, but also analogous repeat units, non-limiting examples being methacrylamide, N-methylacrylamide and N,N-dimethylacrylamide; functionalized extensions of acrylamide, a non-limiting example being acrylamidomethylpropane sulfonic acid; hydrolysis products of acrylamide, a non-limiting example being acrylic acid and acrylic and methacrylic acid esters. Formula I, as detailed below, provides a non-limiting description of repeat units from an acrylamide monomer according to the invention.

As used herein, the term "carrier solvent" refers to a liquid that carries the microparticles into the water-in-oil emulsion of the invention. As is described below, the microparticles are mixed, dissolved and/or dispersed in the carrier solvent, which is then added to the water-in-oil emulsion polymer.

As used herein, the term "fluidizing agent" refers to a liquid that is added to the water-in-oil emulsion of the invention to adjust and provide desired rheological properties, including, but not limited to, flow properties and viscosity.

As used herein, the term "Hansen Solubility Parameter" refers to the system of describing solute solubility in a solvent based on the parameters $\delta_d$ (nonpolar parameter), $\delta_p$ (polar parameter), ah (hydrogen bonding parameter), and $\delta_t$ (total solubility parameter). See Sinha et al., "Computer Aided Solvent Design For Lithographic Blanket Wash System," Annual AICHE Meeting, 1998.

Embodiments of the present invention provide a method of treating a subterranean formation penetrated by a well bore including:
(a) preparing a fracturing fluid containing a mixture resulting from:
(I) providing a water-in-oil emulsion composition that includes:
(i) 5% to 99% by weight of a water-in-oil emulsion polymer including a polymer or copolymer containing repeat units from an acrylamide monomer;
(ii) 0.5% to 90% by weight of a carrier solvent; and
(iii) 0 to 90% by weight of a fluidizing agent; and adding
(iv) 0.1% to 10% by weight of one or more inorganic microparticles, where the total of all components is 100% by weight; and (II) adding the water-in-oil emulsion composition to water; and (b) contacting the subterranean formation with the fracturing fluid.

Any suitable water-in-oil emulsion polymer can be used in the present invention. Suitable water-in-oil emulsion polymers include water-in-oil emulsion polymers containing polymers and copolymers of acrylamide. In an embodiment of the present invention, the water-in-oil emulsion polymer includes a hydrophobic oil phase, a surfactant system and a polymer-containing aqueous phase comprising water and the polymer or copolymer containing repeat units from an acrylamide monomer. Commercially available "water-in-oil emulsion polymers" that could be used in the present invention include, but are not limited to, KR-F2311, KR-F2375 and KR-F5315 available from Kroff Chemical Company, Inc.

In an embodiment of the invention, any suitable hydrophobic liquid can be used in the oil phase. Suitable hydrophobic liquids are those that provide stable water-in-oil emulsion polymers. As used herein, the term "stable water-in-oil emulsion polymers" refers to water-in-oil emulsion polymers where the dispersed aqueous phase does not substantially separate from the hydrophobic oil phase and any minimal separation that does occur is reversible by means of mixing, shaking or stirring the water-in-oil emulsion polymer. Suitable hydrophobic liquids for use in the oil phase include, but are not limited to, mineral oil, synthetic oil, modified oil, paraffinic oil, benzene, xylene, toluene, mineral oils, kerosene, napthas, petroleums and blends of aromatic and aliphatic hydrocarbons containing 4 or greater carbon atoms and vegetable oil. Examples of suitable hydrophobic liquids that may be used include, but are not limited to, paraffinic hydrocarbon oils described in U.S. Pat. No. 3,624,019 to Anderson et al., dearomatized hydrocarbon fluids sold under the trade names Exxsol™, Isopar™, and Norpar™, by Exxon Mobil Corporation, Houston, Tex., and petroleum distillates sold under the trade name Kensol® by American Refining Group, Inc., Bradford, Pa.

In an embodiment of the invention, the hydrophobic oil phase makes up at least 10%, in some cases at least 15%, in other cases at least 20% and in some situations at least 25% by weight of the water-in-oil emulsion polymer. Also, the hydrophobic oil phase is present at up to 90%, in some cases up to 80%, in other cases up to 70%, in some situations up to 60% and in other situations up to 50% by weight of the water-in-oil emulsion polymer. The amount of hydrophobic oil phase in the water-in-oil emulsion polymer can vary between any of the values recited above.

In an embodiment of the invention, any suitable surfactant system can be used in the oil phase. Suitable surfactant systems are those that provide stable water-in-oil emulsion polymers. Examples of surfactants that can be used in the surfactant system of the present invention include, but are not limited to, alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylates with 1 to 30 oxypropylene units, $C_6$-$C_{22}$ linear or branched alkyl ethoxylates/propoxylates with 1 to 30 combined oxyethylene and propoxylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate, ethylene oxide condensates of fatty acid amides, and mixtures thereof. Non-limiting examples of suitable surfactant systems are disclosed in U.S. Pat. Nos. 4,672,090 and 4,772,659 to Chan, 4,935,456 to Huang et al., 3,826,771 to Anderson et al., 3,278,506 to Charmot et al., 3,284,393 to Vanderhoff et al. and 4,070,323 to Vanderhoff et al., the disclosures of which are herein incorporated by reference.

In an embodiment of the invention, the surfactant system makes up at least 0.1%, in some cases at least 0.5%, in other cases at least 0.75% and in some situations at least 1% by weight of the water-in-oil emulsion polymer. Also, the surfactant system is present at up to 10%, in some cases up to 8%, in other cases up to 7%, in some situations up to 6% and in other situations up to 5% by weight of the water-in-oil emulsion polymer. The amount of the surfactant system in the water-in-oil emulsion polymer can vary between any of the values recited above.

In an embodiment of the invention, the polymer-containing aqueous phase including water and the polymer or copolymer containing repeat units from an acrylamide monomer makes up at least 5%, in some cases at least 7.5%, in other cases at least 10% and in some situations at least 12.5% by weight of the water-in-oil emulsion polymer. Also, the aqueous phase is present at up to 90%, in some cases up to 80%, in other cases up to 70%, in some situations up to 60% and in other situations up to 50% by weight of the water-in-oil emulsion polymer. The amount of aqueous phase in the water-in-oil emulsion polymer can vary between any of the values recited above.

In an embodiment of the invention, the polymer or copolymer containing repeat units from an acrylamide monomer in the aqueous phase makes up at least 2%, in some cases at least 3%, in other cases at least 5% and in some situations at least 10% by weight of the water-in-oil emulsion polymer. Also, the polymer or copolymer in the aqueous phase is present at up to 89.5%, in some cases up to 80%, in other cases up to 70%, in some situations up to 60% and in other situations up to 50% by weight of the water-in-oil emulsion polymer. The amount of polymer or copolymer in the aqueous phase in the water-in-oil emulsion polymer can vary between any of the values recited above.

In an embodiment of the invention, the polymer or copolymer of the aqueous phase is selected from non-ionic poly (acrylamide) homopolymers, non-ionic copolymers, anionic copolymers, cationic copolymers, amphoteric copolymers and ampholytic copolymers.

As used herein, the term "anionic copolymer" refers to polymers containing acrylamide repeat units and repeat units from a monomer that can carry a negative charge at an appropriate pH and/or when neutralized with a suitable cation, non-limiting examples being acrylic acid, methacrylic acid and acrylamidomethylpropanesulfonic acid.

As used herein, the term "cationic copolymer" refers to polymers containing acrylamide repeat units and repeat units from a monomer that carries a positive charge, non-limiting examples being methacrylamidopropyltrimethyl ammonium chloride, methacryloyloxyethyl trimethyl ammonium methylsulfate, acryloyloxyethyl trimethyl ammonium chloride and dimethyl diallyl ammonium chloride.

As used herein, the term "amphoteric copolymer" refers to polymers containing acrylamide repeat units and repeat units from a monomer that carries a positive charge at an appropriate pH and a monomer that carries a negative charge at an appropriate pH. Non-limiting examples of the former are methacrylamidopropyldimethylamine, methacryloyloxyethyldimethylamine and methyl diallyl amine, and the latter are acrylic acid, methacrylic acid and maleic acid.

As used herein, the term "ampholytic copolymer" refers to polymers containing acrylamide repeat units and repeat units from a monomer that carries a positive charge and a monomer that carries a negative charge at an appropriate pH. Nonlimiting examples of the former are methacrylamidopropyltrimethyl ammonium chloride, methacryloyloxyethyl trimethyl ammonium methylsulfate and dimethyl diallyl ammonium chloride, and the latter are acrylic acid, methacrylic acid and maleic acid.

In an embodiment of the present invention, the repeat units from an acrylamide monomer in the polymer or copolymer include one or more repeat units according to formula I:

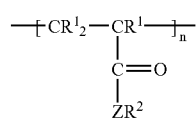
(I)

wherein each occurrence of $R^1$ is independently selected from H, methyl and ethyl; n is an integer from 10 to 10,000,000; Z is selected from —O— and —$NR^2$—; and each occurrence of $R^2$ is independently selected from the group consisting of H, $C_1$-$C_{22}$ linear, branched or cyclic alkyl, aryl, alkaryl, aralkyl or alkenyl, a group —$R^3$—$NR^2{}_2$, a group —$R^3$—$N^+R^2{}_3X$ and a group —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate. When referred to as a divalent linking group, poly(ethyleneoxide) refers to polyethoxy repeat units and poly(propyleneoxide) refers to polypropoxy repeat units that link the indicated species together.

In a particular embodiment of the invention, the copolymer of the aqueous phase includes repeat units derived from acrylamide and repeat units derived from one or more monomers selected from acrylamidopropyl trimethyl ammonium chloride (APTAC), methacrylamidopropyltrimethyl ammonium chloride (MAPTAC), methacryloyloxyethyl trimethyl ammonium chloride (METAC), methacryloyloxyethyl trimethyl ammonium methylsulfate (METAMS), acryloyloxyethyl trimethyl ammonium chloride (AETAC), dimethyl diallyl ammonium chloride (DMDAAC), acrylic acid (AA), methacrylic acid (MAA), 2-acrylamido-2-methylpropane sulfonic acid (AMPSA), 2-methacrylamido-2-methylpropane sulfonic acid (MAMPSA), $C_1$-$C_3$ alkyl acrylate, $C_1$-$C_3$ alkyl methacrylate, n-alkyl acrylamide, methacrylamide, n-alkylmethacrylamide and/or diacetone acrylamide.

The molecular weight of the polymer or copolymer in the water-in-oil emulsion polymer is typically approximated by measuring the reduced viscosity of a solution of the polymer using an appropriately sized Ubbelohde Capillary Viscometer at 0.05 g/dl in 1N NaCl at 30° C. and pH of 7. In an embodiment of the invention, the polymer or copolymer of the aqueous phase has a reduced viscosity of at least 5 dl/g, in some cases at least 6 dl/g, in some situations at least 8 dl/g and in other situations at least 10 dl/g. Also, the polymer or copolymer of the aqueous phase has a reduced viscosity of up to 50 dl/g, in some cases up to 35 dl/g and in other cases up to 20 dl/g. The reduced viscosity of the polymer or copolymer can vary between any of the values recited above.

Although the molecular weight of the polymer or copolymer can be difficult to determine, it can be measured using gel permeation chromatography (GPC) using acrylamide or poly (styrene sulfonate) standards as is known in the art. As such, the molecular weight of the polymer or copolymer can be at least 10,000, in some cases at least 25,000 and in other cases at least 50,000. Also, the molecular weight can be up to 50,000,000, in some cases up to 10,000,000 and in other cases up to 1,000,000 as measured using GPC techniques. The molecular weight of the polymer or copolymer can vary between any of the values recited above.

In the invention, one or more inorganic microparticles can be added to the fracturing fluid either as part of the water-in-oil emulsion composition and optionally, separately to the fracturing fluid. As used herein, the term "microparticle" is meant to mean solid particles with very small dimensions, which can range from nanometers to microns.

In an embodiment of the present invention, any suitable inorganic microparticle can be used. Suitable inorganic microparticles include, but are not limited to, fumed silica, fumed alumina, precipitated silica, colloidal silica, alumina silicates, surface treated silica, calcium carbonate, silica flour, diatomites, talc, borosilicates, and mixtures thereof. As non-limiting examples, the inorganic microparticles can include the Cab-O-Sil® and Cab-O-Sperse® fumed products available from Cabot Corporation, Tuscola, Ill.; Sipermat® and Acemat® precipitated silicas and silicates available from Degussa Corporation, Parsippany; NJ, LUDOX® colloidal silicas available from W.R. Grace & Co., Columbia, Md.; REMSOL® colloidal silica available from REMET UK Ltd., Crayford, Kent, UK; ground calcium carbonate and precipitated calcium carbonate such as those products available from Imerys SA, Paris, France; and the microparticles disclosed in U.S. Pat. No. 6,517,677 to Cardile et al. at col. 9, lines 20-67, the disclosure of which is hereby incorporated by reference. Treated silicas can include surface treated or surface modified silica that has been treated with organic materials (hydrophobic silica) or alumina (alumina treated silica) as is known in the art. Non-limiting examples of treated silicas that can be used include the Cab-O-Sil® TS products available from Cabot Corporation.

In a particular embodiment of the present invention, the inorganic microparticles include one or more microparticles selected from fumed silica, precipitated silica and colloidal silica.

In an embodiment of the present invention, the particle size of the inorganic microparticle is at least 1 nm, in some cases at least 5 nm, in other cases at least 10 nm, in some situations at least 50 nm and in other situations at least 1 μm. The particle size of the inorganic microparticles is large enough to provide an enhancement of the rheology of solutions/dispersions of the present water-in-oil emulsion composition. Also, the particle size of the inorganic microparticles can be up to 100 μm, in some cases up to 50 μm, in other cases up to 10 μm, in some situations up to 5 μm and in other situations up to 1 μm. The particle size of the inorganic microparticle is not so large as to cause it to settle out of the present water-in-oil emulsion composition and any separation that does occur is reversible by means of mixing, shaking or stirring the water-in-oil emulsion composition. The particle size of the inorganic microparticle can vary between any of the values recited above.

As used herein, "rheology" refers to the deformation and flow properties of the fracturing fluid to include shear-strain relationships and viscosity. Particular rheological characteristics include, but are not limited to, the shear response of the fracturing fluid, viscoelasticity, pseudoplasticity, thixotropy and hysteresis properties as a result of stress, strain and shear history applied to the fracturing fluid.

In an embodiment of the present invention, the surface area of the inorganic microparticle is at least 1 $m^2$/g, in some cases at least 25 $m^2$/g, in other cases at least 50 $m^2$/g, in some situations at least 75 $m^2$/g and in other situations at least 100 m²/g. The surface area of the inorganic microparticles is large enough to provide an interaction between the microparticles and the polymer molecules of the present water-in-oil emulsion composition. Also, the surface area of the inorganic microparticles can be up to 1,000 m²/g, in some cases up to 500 m²/g, in other cases up to 400 m²/g, in some situations up to 300 m²/g and in other situations up to 250 m²/g. The surface area of the inorganic microparticle is not so large as to cause gelation of the present water-in-oil emulsion composition. The surface area of the microparticles is determined using BET nitrogen absorption as is known in the art. The surface area of the inorganic microparticle can vary between any of the values recited above.

In an embodiment of the invention, the inorganic microparticles make up at least 0.1%, in some cases at least 0.2%, in other cases at least 0.3% and in some situations at least 0.5% by weight of the water-in-oil emulsion composition. The amount of inorganic microparticles is sufficient to provide an enhancement of the viscosity of solutions/dispersions of the present water-in-oil emulsion composition. Also, the inorganic microparticles are present at up to 10%, in some cases up to 7.5%, in other cases up to 5%, in some situations up to 4% and in other situations up to 3% by weight of the water-in-oil emulsion composition. The amount of microparticles in the present water-in-oil emulsion composition is not so high as to cause instability or gelation of the water-in-oil emulsion composition. The amount of inorganic microparticles in the water-in-oil emulsion composition can vary between any of the values recited above.

In an embodiment of the present invention, the inorganic microparticle is mixed, dissolved and/or dispersed in a suitable carrier solvent and then added to the water-in-oil emulsion polymer. Thus, the carrier solvent can be part of the final water-in-oil emulsion composition. Suitable carrier solvents include, but are not limited to, mineral oil, synthetic oil, modified oil, paraffinic oil, vegetable oil, ethylene carbonate, propylene carbonate, glycols, polyglycols and glycol ethers, and mixtures thereof.

In a particular embodiment of the invention, the carrier solvent can include water. The amount of water that can be included in the carrier solvent is an amount that, when the carrier solvent/microparticle mixture is added to the water-in-oil emulsion composition, does not cause the water-in-oil emulsion composition to invert. As used herein, the term "invert" refers to those situations where the water-in-oil emulsion destabilizes and the oil phase becomes the dispersed phase and the aqueous phase becomes the continuous phase and/or the polymer microgels congeal and/or form a pituitous mass. When water is added to the carrier solvent, it can be included at a level of at least 0.5%, in some cases at least 1%, in other cases at least 5%, in some situations at least 7.5% and in other situations at least 10% by weight of the carrier solvent mixture. Also, water can be included in the carrier solvent at up to 50%, in some cases up to 40%, in other cases up to 30% and in some situations up to 25% by weight of the carrier solvent mixture. The amount of water that can be added will depend on the amount and type of microparticle employed as well as the components in the water-in-oil emulsion polymer. The amount of water in the carrier solvent can be any value recited above and range between any set of values recited above.

In an embodiment of the present invention, the carrier solvent is a solvent characterized as having Hansen Solubility parameters at 25° C. of:

$\delta_d$ of from 13 to 18, in some cases 12 to 17, and in other cases 13 to 16;

$\delta_p$ of from 6 to 12, in some cases 7 to 11, and in other cases 8 to 10;

$\delta_h$ of at least 20, in some cases 10 to 20, and in other cases 12 to 18; and $\delta_t$ of at least 20, in some cases 10 to 20, and in other cases 12 to 18.

The specific Hansen Solubility parameters for the carrier solvent can vary between any of the values recited above.

In an embodiment of the invention, the carrier solvent makes up at least 0.5%, in some cases at least 0.75%, in other cases at least 1% and in some situations at least 2% by weight of the water-in-oil emulsion composition. The amount of carrier solvent is sufficient to admix the microparticles into the water-in-oil emulsion composition such that it remains stable. Also, the carrier solvent is present at up to 90%, in some cases up to 75%, in other cases up to 50%, in some situations up to 40% and in other situations up to 30% by weight of the water-in-oil emulsion composition. The amount of carrier in the present water-in-oil emulsion composition is not so high as to cause instability of the water-in-oil emulsion composition. The amount of carrier solvent in the water-in-oil emulsion composition can vary between any of the values recited above. As an additional benefit, the carrier solvent helps to prevent freezing in the water-in-oil emulsion composition.

In an embodiment of the present invention, an optional suitable fluidizing agent is added to the water-in-oil emulsion composition of the present invention so that the emulsion has desired flow properties, such as a desired viscosity. Suitable fluidizing agents include, but are not limited to, mineral spirits, diesel, turpentine, hydrotreated naptha, Stoddard solvent, kerosene, and mixtures thereof.

In an embodiment of the present invention, when the fluidizing agent is present, the fluidizing agent makes up at least 0.1%, in some cases at least 1%, in other cases at least 2.5% and in some situations at least 5% by weight of the water-in-oil emulsion composition. The amount of fluidizing agent is sufficient to adjust the flow properties of the water-in-oil emulsion composition such that it remains stable. Also, the fluidizing agent is present at up to 90%, in some cases up to 75%, in other cases up to 50%, in some situations up to 40% and in other situations up to 30% by weight of the water-in-oil emulsion composition. The amount of fluidizing agent in the present water-in-oil emulsion composition is not so high as to cause instability of the water-in-oil emulsion composition. The amount of fluidizing agent in the water-in-oil emulsion composition can vary between any of the values recited above. As an additional benefit, the fluidizing agent helps to prevent freezing in the water-in-oil emulsion composition.

In an embodiment of the present invention, the fracturing fluid includes a mixture provided by adding the above-described water-in-oil emulsion composition to water. Further to this embodiment, the fracturing fluid can additionally include proppant materials.

An advantage of the present invention is that it allows for the predictable, convenient and efficient preparation of fracturing fluids because the multicomponent polymer-microparticle composition is easily metered into the fluid.

In an embodiment of the invention, the water-in-oil emulsion composition makes up at least 0.01%, in some instances at least 0.05%, in some cases at least 0.1%, in other cases at least 0.25%, in some situations at least 0.5% and in other situations at least 1% by weight of the fracturing fluid. Additionally, the water-in-oil emulsion composition can be up to 20%, in some cases up to 15%, in other cases up to 10%, in some situations up to 7% and in other situations up to 5% by weight of the fracturing fluid. The amount of water-in-oil composition used is an amount sufficient to provide desired physical properties. The amount of water-in-oil emulsion can vary in a range between any of the values recited above.

In a further embodiment of the present invention, the emulsion composition is "made down" in a polymer activation system or mix tank as part of the preparation of the inventive fracturing fluid. Typically, a mixing chamber, centrifugal pump and/or eductor is used to initially mix and dilute the feed polymer (in the prior art, the polymer could be in dry, concentrated solution, gel or emulsion form) into water. A predetermined amount of feed polymer is gradually fed into the mixing chamber or eductor, which is the initial feed polymer/water contact site for initial activation of the feed polymer. Once the feed polymer is fed into water, the polymer is allowed to "activate." As used herein, the terms "activate" and/or "activation" refer to a polymer in a dry or gel form transitioning to the bulk water phase, whereby the polymer changes from a tightly coiled structure to a more elongated, extended and relaxed structure.

For a dry polymer, initial activation requires more mixing energy and time because there is minimal water present in the polymer. In addition, the mixing energy required for activation increases with increasing particle size, due to reduced specific surface area. Activation is easier for solution polymers and gels than for dry polymers; however, the viscous nature of solution polymers and gels makes handling (e.g., pumping) of these polymers difficult. Polymers in emulsion form have a relatively low viscosity when compared to solution polymers and, therefore, are easier to handle. Emulsion polymers also activate easier than dry polymers because of the small size of the polymer droplets or discrete gels. Another advantage of water-in-oil emulsion polymers is that they provide higher polymer concentration than solution polymers in liquid form. After the polymer is made down, or during the make down or activation process, one or more proppant materials may be added to the mixture.

In an embodiment of the present invention, any suitable proppant material may be used in the present fracturing fluid. Suitable proppant materials include, but are not limited to, resin coated or uncoated sand, Ottawa type sand (round), Brady type sand (angular), sintered bauxite, ceramic materials and glass beads.

In an embodiment of the present invention, the particle size of the proppant material can be at least 200 µm, in some cases at least 500 µm, in other cases at least 850 µm, in some instances at least 1,000 µm and in other instances at least 1,200 µm. Also, the particle size of the proppant material can be up to 5,000 µm, in some cases up to 4,000 µm, in other cases up to 2,500 µm and in some instances up to 1,700 µm. The particle size of the proppant material can be present in a range of values between any of the values recited above. The particle size is the weight average determined using a series of Tyler Sieves of various mesh sizes available from W.S. Tyler, Mento, Ohio.

Further description of suitable proppant materials, their use and concentrations thereof in the present fracturing fluid are described in Glidley et al., *Recent Advances in Hydraulic Fracturing*, Chapter 6, "Propping Agents and Fracture Conductivity," Society of Petroleum Engineers, Richardson, Tex., pp. 109-130.

In an embodiment of the invention, the fracturing fluid contains at least 0.5, in some cases at least 1 and in other cases at least 10 wt. % proppant material. Also, the fracturing fluid contains up to 30, in some cases up to 25 and in other cases up to 10 wt. % proppant material based on the weight of the fracturing fluid. The amount of proppant material can be any value or range between any of the values recited above.

In another embodiment of the invention, the fracturing fluid contains at least 0.1, in some cases at least 0.5 and in other cases at least 2 pounds of proppant material per gallon of fracturing fluid. Also, the fracturing fluid contains up to 10, in some cases up to 5 and in other cases up to 2 pounds of proppant material per gallon of fracturing fluid. The amount of proppant material can be any value or range between any of the values recited above.

In an embodiment of the present invention, the water used to make up the fracturing fluid can be selected from fresh water, unsaturated brine and saturated brine.

In an embodiment of the present invention, the fracturing fluid can also include one or more polymers selected from hydroxypropylguar, carboxymethylhydroxypropylguar, carboxymethylguar, hydroxyethyl cellulose, grafted hydroxyethyl cellulose, carboxymethyl cellulose and carboxymethylhydroxyethyl cellulose.

In a further embodiment of the invention, the fracturing fluid can also include a pH adjusting compound for elevating the pH of the treating fluid, selected from sodium hydroxide, potassium hydroxide, lithium hydroxide, ammonia, and mixtures thereof. The pH adjusting compound is present at a level sufficient to maintain a desired pH. The level of pH adjusting compound can be from 0.01% to 0.3%, in some cases 0.1% to 2.75% and in other cases 0.5% to 2.5% by weight based on the weight of the fracturing fluid.

In an additional embodiment of the invention, the fracturing fluid can also include an additive that is a pH adjusting compound selected from sodium hydroxide, potassium hydroxide, lithium hydroxide, ammonia, sodium carbonate, potassium carbonate, sodium bicarbonate, potassium bicarbonate, sodium diacetate, potassium diacetate, sodium phosphate, potassium phosphate, sodium dihydrogen phosphate, potassium dihydrogen phosphate, and mixtures thereof. These additives are present at a level sufficient to maintain a desired pH. The level of pH adjusting compound can be from 0.01% to 0.3%, in some cases 0.1% to 2.75% and in other cases 0.5% to 2.5% by weight based on the weight of the fracturing fluid.

In another embodiment of the invention, the fracturing fluid can also include a surfactant selected from $C_2$-$C_{24}$ linear, branched and cyclic alkyl phenol ethoxylates, $C_2$-$C_{24}$ linear, branched and cyclic alkyl ethoxylates, alkyl sulfonates, alkyl aryl sulfonates such as the salts of dodecylbenzene sulfonic acid, alkyltrimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride, and mixtures thereof. The surfactants are present at a level sufficient to enhance the performance of the fracturing fluid. The level of surfactant can be from 0.01% to 2%, in some cases 0.02% to 0.1.75% and in other cases 0.025% to 1.5% by weight based on the weight of the fracturing fluid.

In another further embodiment of the invention, the fracturing fluid can also include a clay stabilizer selected from the group consisting of potassium chloride, sodium chloride, ammonium chloride, tetramethyl ammonium chloride and temporary clay stabilizers. The level of clay stabilizers can be from 0.1% to 10%, in some cases 0.25% to 7.5% and in other cases 0.5% to 5% by weight based on the weight of the fracturing fluid.

In another additional embodiment of the invention, the fracturing fluid can also include a fluid loss control agent selected from the group consisting of silica flour, starches, waxes and resins. The level of fluid loss control agent can be from 0.01% to 0.1%, in some cases 0.02% to 0.075% and in other cases 0.025% to 0.05% by weight based on the weight of the fracturing fluid.

In an additional embodiment of the invention, the fracturing fluid can also include a delayed breaker for causing the treating fluid to revert to a thin fluid selected from the group of oxidizers, encapsulated oxidizers and enzyme breakers consisting of sodium persulfate, potassium persulfate, ammonium persulfate, magnesium peroxide, sodium chlorite, sodium bromate, alpha and beta amylases, amyloglucosidase, invertase, maltase, cellulose, halogenated isocyanurate, hypochlorites and hemicellulase.

The level of delayed breaker can be from 0.01% to 2%, in some cases 0.1% to 1.5% and in other cases 0.5% to 1% by weight based on the weight of the fracturing fluid.

In an embodiment of the present invention, the fracturing fluid, using the method of the present invention, is particularly suitable in carrying out subterranean well formation acidizing, fracturing, fracture-acidizing and other procedures. In these applications, the fracturing fluid of the present invention provides particular advantages in addition to those mentioned above. Not being limited to a single theory, it is believed that initial hydration of the water-in-oil emulsion polymer in the fracturing results in a fracturing fluid having an intermediate viscosity whereby it can be introduced into a subterranean formation to be treated without incurring high friction losses. After the fracturing fluid has been introduced into the formation, the water-in-oil emulsion polymer is further hydrated and interacts with the microparticles to yield maximum viscosity by being heated to formation temperature, or by the passage of time, or both. Also, after reaching the formation and full hydration of the polymer, the microparticles can link or associate with hydrated polymer to further enhance the rheology of the treating fluid in response to a change in pH of the fluid, time and/or temperature.

In an embodiment of the present invention, the present fracturing fluid is injected into a formation by first providing a bore hole or well hole, which may or may not include a casing or liner and may or may not have been shape charged to initiate fractures. The fracturing fluid is pumped into the bore hole or well hole to provide a pressure of 0.1 to 2 psi/ft. (ft. referring to the depth of the bore hole or well hole), in some cases 0.5 to 1.5 psi/ft, depending on the composition of the fracturing fluid and the nature of the formation to be fractured. As such, the pressure in the bore hole or well hole can be at least 500 psi, in some cases at least 1,000 psi, in other cases at least 2,500 psi and in some situations at least 3,000 psi. Also, the pressure in the bore hole or well hole can be up to 10,000 psi, in some cases up to 7,500 psi, in other cases up to 5,000 psi and in some situations up to 4,000 psi. The pressure in the formation can be any value or range between any value recited above.

Not being bound to any single theory, it is believed that the pressure drives the fluid into cracks, fissures and fractures in the formation, forcing such openings to become larger. The proppant material tends to wedge into the expanded cracks, fissures and fractures to help hold them open when the pressure is reduced. However, the pressure can act to force water out of the fluid, in an action similar to syneresis (i.e., exudation of the liquid component of a gel). This liquid can then seep into microscopic and larger cracks, fractures and fissures, thus removing water from the fluid, increasing the effective polymer concentration and therefore the viscosity of the fluid. Such increases in viscosity can limit the ability of the fluid to penetrate the formation. In the present invention, it is believed that the microparticles fill the relatively small cracks, fractures and fissures, slowing or limiting water loss, which increases the productivity and efficiency of the fluid and the fracturing operation.

The present invention will further be described by reference to the following examples. The following examples are merely illustrative of the invention and are not intended to be limiting. Unless otherwise indicated, all percentages are by weight.

EXAMPLES

Example 1

A water-in-oil emulsion composition useful in the present invention was prepared as follows. A first mixture was prepared by combining of 83.25 parts of a 35% active water-in-oil emulsion polymer available as KR-F2375 from Kroff Chemical Company, Inc., Pittsburgh, Pa. with 10 parts mineral spirits. A second mixture was prepared by dispersing fumed silica (BET surface Area ~200 $m^2/g$) in propylene glycol to form a 10 wt. % dispersion. The second mixture was then slowly added to the first mixture with stirring to form an approximately 36 wt. % total solids water-in-oil emulsion composition determined at 105° C. with a Model HR53 Moisture Balance available from Mettler-Toledo, Inc., Columbus, Ohio. The resulting water-in-oil emulsion composition did not gel or destabilize after standing for one month at ambient temperatures. As used herein, the term "destabilize" refers to a congealed product or a product that otherwise does not retain it's original solution makedown characteristics.

Example 2

The following solutions were prepared by dissolving/dispersing the indicated thickener compositions in distilled water. The viscosity of the solutions was measured using a Model 35A Direct Reading Viscometer available from Fann Instrument Company, Houston, Tex., at 100, 200, 300 and 600 rpm and determining the viscosity as well as recording the reading at 511 $sec^{-1}$ (300 rpm). The results are shown in the table below.

| Polymer | Concentration (ppt[1]) | Fann Reading at 511 $sec^{-1}$ | Fann Viscosity |
|---|---|---|---|
| Super Gel 15[2] | 10 | 8.4 | 0.00448 |
| Super Gel 15[2] | 20 | 9.2 | 0.00269 |
| Super Gel 15[2] | 30 | 16.0 | 0.00657 |
| Super Gel 15[2] | 40 | 24.4 | 0.01865 |
| Super Gel 15[2] | 60 | 39.1 | 0.03055 |
| Super Gel 20[3] | 10 | 4.6 | 0.00034 |
| Super Gel 20[3] | 20 | 8.9 | 0.00334 |
| Super Gel 20[3] | 30 | 16.0 | 0.00657 |
| Super Gel 20[3] | 40 | 20.5 | 0.00756 |
| Super Gel 20[3] | 60 | 44.9 | 0.03805 |
| Cw-2k[4] | 10 | 8.1 | 0.00386 |
| Cw-2k[4] | 20 | 12.1 | 0.00598 |
| Cw-2k[4] | 30 | 17.1 | 0.00870 |
| Cw-2k[4] | 40 | 20.0 | 0.00729 |
| Cw-2k[4] | 60 | 28.9 | 0.01579 |
| Example 1 | 2.4 | 7.6 | 0.00190 |
| Example 1 | 7 | 14.9 | 0.00383 |
| Example 1 | 12 | 18.7 | 0.00969 |

-continued

| Polymer | Concentration (ppt[1]) | Fann Reading at 511 sec$^{-1}$ | Fann Viscosity |
|---|---|---|---|
| Example 1 | 17 | 20.2 | 0.01067 |
| Example 1 | 24 | 28.1 | 0.01177 |

[1] pounds per thousand gallons of water including active polymer and microparticle when used
[2] dry polyacrylamide available from Superior Well Services, Inc., Black Lick, PA.
[3] dry polyacrylamide available from Superior Well Services, Inc.
[4] dry polyacrylamide/silica blend available from Superior Well Services, Inc.

The data show the superior viscosity building properties of the water-in-oil emulsion composition of the present invention.

Example 3

This test evaluates the hydration of one composition versus another. The water-in-oil emulsion composition of Example 1 was added to 500 ml of distilled water with mixing. The Fann Viscosity of the solutions was measured over time. In fracturing operations, it is desirable that hydration takes place as fast as possible. The same controls were used as before. The percent hydration is the ratio of the measured viscosity to the ultimate viscosity. The results are shown in the table below.

| Polymer | pH | Time (min.) | 3 | 5 | 7 | 9 | 11 | 13 | 15 | 21 |
|---|---|---|---|---|---|---|---|---|---|---|
| Super Gel 15[2] 2.5 ppt | 6.0 | Viscosity | 12 | 15 | 17 | 17 | 18 | 18 | 19 | 18 |
| | | Hydration (%) | 63 | 79 | 89 | 89 | 95 | 95 | 100 | 95 |
| Super Gel 15[2] 4 ppt | 8.0 | Viscosity | 11 | 14 | 15 | 17 | 18 | 18 | 19 | 19 |
| | | Hydration (%) | 58 | 74 | 79 | 89 | 95 | 95 | 100 | 100 |
| Super Gel 20[3] 2.5 ppt | 6.0 | Viscosity | 14 | 16 | 17 | 18 | 18 | 18 | 18 | 19 |
| | | Hydration (%) | 70 | 80 | 85 | 90 | 90 | 90 | 90 | 95 |
| Super Gel 20[3] 4 ppt | 8.0 | Viscosity | 15 | 17 | 18 | 19 | 19 | 19 | 20 | 20 |
| | | Hydration (%) | 75 | 85 | 90 | 95 | 95 | 95 | 100 | 100 |
| Cw + 2k[4] 2.5 ppt | 6.0 | Viscosity | 5 | 7 | 9 | 10 | 11 | 12 | 12 | 12 |
| | | Hydration (%) | 31 | 44 | 56 | 63 | 39 | 75 | 75 | 75 |
| Cw + 2k[4] 4 ppt | 8.0 | Viscosity | 7 | 10 | 13 | 14 | 14 | 14 | 14 | 15 |
| | | Hydration (%) | 44 | 63 | 81 | 88 | 88 | 88 | 88 | 94 |
| Example 1 2.5 ppt | 6.0 | Viscosity | 12 | 13 | 13 | 14 | 14 | 15 | 15 | 15 |
| | | Hydration (%) | 80 | 87 | 87 | 93 | 93 | 100 | 100 | 100 |
| Example 1 4 ppt | 8.0 | Viscosity | 14 | 15 | 15 | 15 | 15 | 15 | 15 | 15 |
| | | Hydration (%) | 93 | 100 | 100 | 100 | 100 | 100 | 100 | 100 |

The data demonstrate the shorter hydration time of the water-in-oil emulsion composition of the present invention. Further, equivalent viscosities are obtained using less polymer.

Examples 4 and 5

The following example illustrates the invention by running two stimulations in the same gas field, the wells approximately 1400 feet apart in the upper Devonian geological strata. The first stimulation is based on a prior art treatment using dry partially hydrolyzed polyacrylamide (PHPA). The second stimulation is based on a treatment according to the invention. The treatments are summarized in the following table (MCF/day=1000 cubic feet per day).

| | Example 4 | Example 5 |
|---|---|---|
| Polymer | dry PHPA | Emulsion product of Example 1 |
| Polymer concentration | Not Recorded | 6 lb./1,000 gal |
| Propping Agent | 20/40 grade sand | 20/40 grade sand |
| Proppant amount | 1.33 (lb./gal. treatment) | 1.25 (lb./gal. treatment) |
| Well depth | 3,749 ft. | 3,854 ft. |
| Gas flow after treatment | 504 MCF/day | 1,500 MCF/day |
| Open gas flow after treatment | 9 CFD/lb. proppant | 12.24 CFD/lb. proppant |

The data demonstrate the superior performance, as evidenced by higher gas production, when the emulsion according to the present invention is used in treatments to fracture gas wells.

Examples 6 and 7

The following examples illustrate the invention by running two stimulations in the same gas field, the wells approximately 850 feet apart in the upper Devonian geological strata. The first stimulation is based on a prior art treatment using dry guar. The second stimulation is based on a treatment according to the invention. The treatments are summarized in the following table (MCF/day=1000 cubic feet per day).

| | Example 4 | Example 5 |
|---|---|---|
| Polymer | guar | Emulsion product of Example 1 |
| Polymer concentration | 10 lb./1,000 gal | 6 lb./1,000 gal |
| Propping Agent | 20/40 grade sand | 20/40 grade sand |
| Proppant amount | 1.47 (lb./gal. treatment) | 1.45 (lb./gal. treatment) |
| Well depth | 3,371 ft. | 3,700 ft. |
| Gas flow after treatment | 198 MCF/day | 1,007 MCF/day |
| Open gas flow after treatment | 2.83 CFD/lb. proppant | 7.24 CFD/lb. proppant |

The data demonstrate the superior performance, as evidenced by higher gas production, when the emulsion according to the present invention is used in treatments to fracture gas wells.

The present invention has been described with reference to specific details of particular embodiments thereof. It is not intended that such details be regarded as limitations upon the scope of the invention except insofar as and to the extent that they are included in the accompanying claims.

We claim:

1. A method of treating a subterranean formation penetrated by a well bore comprising:
   (a) preparing a fracturing fluid containing a mixture resulting from:
      (I) providing a water-in-oil emulsion composition comprising:
         (i) 5% to 99% by weight of a water-in-oil emulsion comprising:
            (1) 10% to 90% by weight of a hydrophobic oil phase;
            (2) 0.5% to 10% by weight of a surfactant system; and
            (3) 5% to 90% by weight of a polymer-containing aqueous phase comprising water and a polymer or copolymer containing repeat units from an acrylamide monomer, wherein the polymer or copolymer comprises from 2% by weight to 89.5% by weight of the water-in-oil emulsion;
         (ii) 0.5% to 90% by weight of a carrier solvent; and
         (iii) 0 to 90% by weight of a fluidizing agent;
      and adding
         (iv) 0.1% to 10% by weight of one or more inorganic microparticles, where the total of all components is 100% by weight; and
      (II) adding the water-in-oil emulsion composition to water; and
   (b) contacting the subterranean formation with the fracturing fluid.

2. The method of claim 1, wherein the fracturing fluid further comprises (v) 1% to 50% by weight of a proppant material.

3. The method of claim 2, wherein the proppant material is selected from the group consisting of resin coated or uncoated sand, sintered bauxite, ceramic materials and glass beads.

4. The method of claim 2, wherein the proppant material is present in the fracturing fluid in an amount in the range of from about 0.1 to about 10 pounds of proppant material per gallon of the fracturing fluid.

5. The method of claim 1, the oil phase comprises one or more oils selected from the group consisting of mineral oil, synthetic oil, modified oil, paraffinic oil, benzene, xylene, toluene, kerosene, napthas, petroleums, blends of aromatic and aliphatic hydrocarbons containing 4 or greater carbon atoms, and vegetable oil.

6. The method of claim 1, wherein the surfactant system comprises of one or more surfactants selected from the group consisting of alkanolamides, polyoxyethylene derivatives of sorbitan esters, sorbitan monooleate, sorbitan monostearate, $C_6$-$C_{22}$ linear or branched alkyl ethoxylates with 1 to 30 oxyethylene units, $C_6$-$C_{22}$ linear or branched alkyl propoxylate with 1 to 30 oxypropylene units, $C_6$-$C_{22}$ linear or branched alkyl ethoxylate/propoxylate with 1 to 30 combined oxyethylene and propoxylate units, alkylaryl ethoxylates containing a $C_6$-$C_{22}$ aryl group with 1 to 30 oxyethylene units, hexadecyl sodium phthalate, cetyl sodium phthalate, stearyl sodium phthalate and ethylene oxide condensates of fatty acid amides.

7. The method of claim 1, wherein the polymer or copolymer of the aqueous phase is selected from non-ionic poly(acrylamide) homopolymer, non-ionic copolymers, anionic copolymers, cationic copolymers, amphoteric copolymers and ampholytic copolymers.

8. The method of claim 1, wherein the polymer or copolymer comprises one or more repeat units according to formula I:

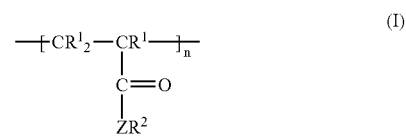

wherein each occurrence of $R^1$ is independently selected from H, methyl and ethyl; n is an integer from 10 to 10,000,000; Z is —$NR^2$—; and each occurrence of $R^2$ is independently selected from the group consisting of H, $C_1$-$C_{22}$ linear, branched or cyclic alkyl, aryl, alkaryl, aralkyl or alkenyl, a group —$R^3$—$NR^2{}_2$, a group —$R^3$—$N^+R^2{}_3X$, and a group —$R^3$—$SO_3Y$, wherein $R^2$ is as previously defined, $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate.

9. The method of claim 1, wherein the copolymer of the aqueous phase further comprises repeat units derived from acrylamidopropyl-trimethyl ammonium chloride, methacrylamidopropyltrimethyl ammonium chloride, methacryloyloxyethyl trimethyl ammonium chlorides methacryloyloxyethyl trimethyl ammonium methylsulfate, acryloyloxyethyl trimethyl ammonium chloride, dimethyl diallyl ammonium chloride, acrylic acid, methacrylic acid, 2-acrylamido-2-methylpropane sulfonic acid, 2-methacrylamido-2-methylpropane sulfonic acid, $C_1$-$C_3$ alkyl acrylate, $C_1$-$C_3$ alkyl methacrylate, n-alkyl acrylamide, methacrylamide, n-alkylmethacrylamide and diacetone acrylamide.

10. The method of claim 1, wherein the polymer or copolymer of the aqueous phase has a reduced viscosity, measured using a Ubbelohde Capillary Viscometer at 0.05 g/dl in 1N NaCl at 30° C. and pH of 7 of from 5 to 50 dl/g.

11. The method of claim 1, wherein the inorganic microparticles (iv) include one or more microparticles selected from the group consisting of fumed silica, precipitated silica, colloidal silica, alumina silicates, surface treated silica, calcium carbonate, talc and borosilicates.

12. The method of claim 1, wherein the inorganic microparticles (iv) include one or more microparticles selected from the group consisting of fumed silica, precipitated silica, silica flour, diatomites and colloidal silica.

13. The method of claim 1, wherein the carrier solvent (ii) is one or more selected from the group consisting of mineral oil, synthetic oil, modified oil, paraffinic oil, vegetable oil, ethylene carbonate, propylene carbonate, glycols, polyglycols, and glycol ethers.

14. The method of claim 1, wherein the carrier solvent (ii) is a solvent characterized as having Hansen Solubility parameters at 25° C. of:
   $\delta_d$ of from 13 to 18;
   $\delta_p$ of from 6 to 12;
   $\delta_h$ of at least 20; and
   $\delta_t$ of at least 20.

15. The method of claim 1, wherein the water is selected from the group consisting of fresh water, unsaturated brine and saturated brine.

16. The method of claim 1, wherein the fracturing fluid further comprises one or more polymers selected from the group consisting of hydroxypropylguar, carboxymethylhydroxypropylguar, carboxymethylguar, hydroxyethyl cellulose, grafted hydroxyethyl cellulose, carboxymethyl cellulose and carboxymethylhydroxyethyl cellulose.

17. The method of claim 1, wherein the water-in-oil emulsion composition is present in the treating fluid in an amount in the range of from about 0.01% to about 10% by weight of the fracturing fluid.

18. The method of claim 1, wherein the fracturing fluid further comprises from 0.01% to 0.1% by weight of a surfactant selected from the group consisting of $C_2$-$C_{24}$ linear, branched and cyclic alkyl phenol ethoxylates, $C_2$-$C_{24}$ linear, branched and cyclic alkyl ethoxylates, alkyl sulfonates, alkyl aryl sulfonates such as the salts of dodecylbenzene sulfonic acid, alkyltrimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols and trialkyl benzylammonium chloride.

19. The method of claim 1, wherein the fracturing fluid further comprises from 0.01% to 1% by weight a fluid loss control agent selected from the group consisting of silica flour, starches, waxes and resins.

20. The method of claim 1, wherein the fracturing fluid further comprises from 0.01 to 2% by weight of a delayed breaker for causing the treating fluid to revert to a thin fluid comprising oxidizers and encapsulated oxidizers selected from the group consisting of sodium persulfate, potassium persulfate, ammonium persulfate, magnesium peroxide, sodium chlorite, sodium bromate, halogenated isocyanurate, and hypochlorites.

21. The method of claim 1, further comprising the step of (c) mixing a proppant material with at least a portion of the fracturing fluid.

22. The method of claim 1, wherein the polymer or copolymer containing repeat units from an acrylamide monomer further comprises one or more repeat units according to Formula I:

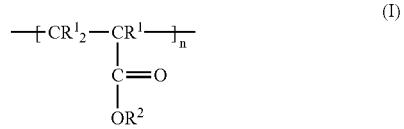

wherein each occurrence of $R^1$ is independently selected from H, methyl and ethyl; n is an integer from 10 to 10,000,000; and each occurrence of $R^2$ is independently selected from the group consisting of H, $C_1$-$C_{22}$ linear, branched or cyclic alkyl, aryl, alkaryl, aralkyl or alkenyl, a group —$R^3$—$NR^2{}_2$, a group —$R^3$—$N^+R^2{}_3X$, and a group —$R^3$—$SO_3Y$, wherein $R^1$ is as previously defined; $R^3$ is a divalent linking group selected from the group consisting of $C_1$-$C_{22}$ linear, branched or cyclic alkylene, arylene, alkarylene, aralkylene or alkenylene, poly (ethyleneoxide) and poly(propyleneoxide); Y is H or an alkali metal ion; and X is a halide or methylsulfate.

23. A method of treating a subterranean formation penetrated by a well bore comprising:
(a) preparing a fracturing fluid containing a mixture resulting from:
(I) providing a water-in-oil emulsion composition comprising:
(i) 5% to 99% by weight of a water-in-oil emulsion comprising a polymer or copolymer containing repeat units from an acrylamide monomer;
(ii) 0.5% to 90% by weight of a carrier solvent; and
(iii) 0 to 90% by weight of a fluidizing agent;
and adding
(iv) 0.1% to 10% by weight of one or more inorganic microparticles, where the total of all components is 100% by weight; and
(II) adding the water-in-oil emulsion composition to water; and
(b) contacting the subterranean formation with the fracturing fluid, wherein the fracturing fluid further comprises 0.01% to 0.3% by weight of a pH adjusting compound for elevating the pH of the treating fluid selected from the group consisting of sodium hydroxide, potassium hydroxide and lithium hydroxide.

24. A method of treating a subterranean formation penetrated by a well bore comprising:
(a) preparing a fracturing fluid containing a mixture resulting from:
(I) providing a water-in-oil emulsion composition comprising:
(i) 5% to 99% by weight of a water-in-oil emulsion comprising a polymer or copolymer containing repeat units from an acrylamide monomer;
(ii) 0.5% to 90% by weight of a carrier solvent; and
(iii) 0 to 90% by weight of a fluidizing agent;
and adding
(iv) 0.1% to 10% by weight of one or more inorganic microparticles, where the total of all components is 100% by weight; and
(II) adding the water-in-oil emulsion composition to water; and
(b) contacting the subterranean formation with the fracturing fluid, wherein the fracturing fluid further comprises from 0.01% to 0.3% by weight of a pH adjusting compound selected from the group consisting of sodium hydroxide, potassium hydroxide, lithium hydroxide, ammonia, sodium carbonate, potassium carbonate, sodium bicarbonate, potassium bicarbonate, sodium diacetate, potassium diacetate, sodium phosphate, potassium phosphate, sodium dihydrogen phosphate, potassium dihydrogen phosphate, and mixtures thereof.

25. A method of treating a subterranean formation penetrated by a well bore comprising:
(a) preparing a fracturing fluid containing a mixture resulting from:
(I) providing a water-in-oil emulsion composition comprising:
(i) 5% to 99% by weight of a water-in-oil emulsion comprising a polymer or copolymer containing repeat units from an acrylamide monomer;
(ii) 0.5% to 90% by weight of a carrier solvent; and
(iii) 0 to 90% by weight of a fluidizing agent;
and adding
(iv) 0.1% to 10% by weight of one or more inorganic microparticles, where the total of all components is 100% by weight; and
(II) adding the water-in-oil emulsion composition to water; and
(b) contacting the subterranean formation with the fracturing fluid, wherein the fracturing fluid further comprises from 0.1% to 10% by weight of a clay stabilizer selected from the group consisting of potassium chloride, sodium chloride, ammonium chloride, tetramethyl ammonium chloride and temporary clay stabilizers.

* * * * *

UNITED STATES PATENT AND TRADEMARK OFFICE
CERTIFICATE OF CORRECTION

| | | |
|---|---|---|
| PATENT NO. | : 7,482,310 B1 | Page 1 of 1 |
| APPLICATION NO. | : 10/988216 | |
| DATED | : January 27, 2009 | |
| INVENTOR(S) | : Reese et al. | |

It is certified that error appears in the above-identified patent and that said Letters Patent is hereby corrected as shown below:

Column 19, Line 52, Claim 22, "wherein $R^1$" should read -- wherein $R^2$ --

Signed and Sealed this

Nineteenth Day of May, 2009

JOHN DOLL
*Acting Director of the United States Patent and Trademark Office*